United States Patent [19]

Fugazza et al.

[11] Patent Number: 4,586,466

[45] Date of Patent: May 6, 1986

[54] MECHANICAL STARTER FOR INTERNAL COMBUSTION ENGINES

[75] Inventors: Ermanno Fugazza, Rivoli; Giuseppe Dal Poz, Pianezza, both of Italy

[73] Assignee: A.M.S.E.A. - Azienda Meccanica Stampaggi e Attrezzature S.p.A., Pianezza, Italy

[21] Appl. No.: 472,500

[22] Filed: Mar. 7, 1983

[30] Foreign Application Priority Data

Mar. 11, 1982 [IT] Italy .............................. 20093 A/82

[51] Int. Cl.[4] .......................... F02N 5/02; F03G 1/04

[52] U.S. Cl. ............................ 123/179 S; 123/185 R; 74/6; 185/39

[58] Field of Search ...................... 74/6, 8; 123/179 S, 123/179 SE, 185 R; 185/43, 37, 39, 41 A

[56] References Cited

U.S. PATENT DOCUMENTS

| | | | |
|---|---|---|---|
| 2,568,136 | 9/1951 | Weimer | 185/39 |
| 3,853,109 | 12/1974 | Dooley | 185/39 |
| 4,135,329 | 1/1979 | Kennedy | 185/39 |
| 4,315,562 | 2/1982 | Tangorra et al. | 185/37 |
| 4,333,553 | 6/1982 | Hoppie et al. | 185/37 |
| 4,441,466 | 4/1984 | Tangorra | 185/39 |
| 4,543,922 | 10/1985 | Fugazza et al. | 123/179 S |

*Primary Examiner*—Kenneth J. Dorner
*Assistant Examiner*—Vinh Luong
*Attorney, Agent, or Firm*—Stevens, Davis, Miller & Mosher

[57] ABSTRACT

A mechanical starter is formed by two disc-shaped elements coaxial with each other and rotatable with respect to each other to which at least two strips of elastomeric material, coplanar with each other, are fixed through their ends. One of the two disc-shaped elements is secured to an envelope of the internal combustion engine while the other disc-shaped element rotates with respect to the first. Apparatus is provided for deforming the strips of elastomeric material to thereby store energy in the strips and for delivering the stored energy to the shaft of the engine.

9 Claims, 5 Drawing Figures

MECHANICAL STARTER FOR INTERNAL COMBUSTION ENGINES

BACKGROUND OF THE INVENTION

The present invention relates to a mechanical starter for internal combustion engines and, more particularly, to a mechanical starter for internal combustion engines of the type comprising at least two disc-shaped elements rotatable with respect to each other for deforming a body of elastomeric material, thus storing energy therein, and for delivering the stored energy directly or indirectly to the shaft of an internal combustion engine to put it into service.

Different types of mechanical starters for internal combustion engines are known and can be grouped into three types.

A first type of known starter is only manual and comprises a crank capable of engaging with the shaft of the internal combustion engine which is hand operated by an operator. Alternatively, the manual starter may employ a mechanism formed by the assembly of a groove pulley and a rope which may be wound within the groove of the pulley with one end fixed thereto. The mechanism is set in action by putting the rope under traction by an operator pulling on its free end.

A second type of known mechanical starter for internal combustion engines comprises a fluid dynamic device, i.e., a device employing a fluid in which the energy is stored as a pressure increase of the fluid of the device. A mechanical means is employed which may be hand operated to increase the pressure of the fluid and a means for supplying to so stored energy to the shaft of an internal combustion engine to cause its starting is also provided.

A third type of known mechanical starter, to which the present invention relates, comprises two disc-shaped elements rotatable with respect to each other, between which there is interposed a deformable body of elastomeric material. The rotation of the two disc-shaped elements is effected so as to deform the body of elastomeric material storing in this way energy in the body which is then delivered to the shaft of an internal combustion engine for starting it.

The known mechanical starters of the first type are laborious for an operator to actuate and are dangerous as an operator may be injured by kicks of the engine with which they are connected. The only merit of these types of starters is that they have very reduced overall dimensions.

Known mechanical starters of the second type are not very reliable over time, are negatively affected by unfavorable climatic conditions, and are heavy and bulky considering the quantity of energy they are able to deliver.

The known mechanical starters of the third type are very cumbersome and very heavy, and for this reason have not enjoyed widespread industrial use.

SUMMARY OF THE INVENTION

The present invention is designed to overcome all of the drawbacks of the known mechanical starters for internal combustion engines, and provide a mechanical starter of the abovedescribed third type, which can be miniaturized, i.e., is of minimum dimensions and weight, which is safe for the operator in the sense of not subjecting the operator to risks and which is of great reliability in the sense that for long periods of service it does not require maintenance.

The object of the present invention is to provide a mechanical starter for internal combustion engines of the type comprising a pair of disc-shaped elements coaxial with and rotatable with respect to each other and deformable elastic bodies interposed between the disc-shaped elements, characterized by the fact that the deformable elastic bodies are at least two strips of elastomeric material whose axes lie on the same plane, the strips of elastomeric material having one end fixed to one disc-shaped element and the other end fixed to the other disc-shaped element, while on one of said disc-shaped elements there are provided supporting and guiding small rollers for the strips of elastomeric material, means being provided for moving one disc-shaped element with respect to the other so as to deform the strips, and means for connecting one of the disc-shaped elements to the shaft of an internal combustion engine to permit energy stored in the deformable elastic bodies to be imparted to the engine shaft.

BRIEF DESCRIPTION OF THE DRAWINGS

The present invention will be better understood by the following detailed description made by way of non-limiting example with reference to the figures of the accompanying sheets of drawings, in which.

DETAILED DESCRIPTION OF THE INVENTION

In its more general aspect, a mechanical starter for internal combustion engines according to the invention comprises two disc-shaped elements coaxial with each other and rotatable with respect to each other. The two disc-shaped elements are contained one within the other and between them there are arranged strips of elastomeric material whose axes lie on a same plane, one end of each strip being fixed to one disc-shaped element, while the other end of the same strip is fixed to the other disc-shaped element.

In its more general aspects a mechanical starter according to the invention comprises means capable of being drawn near to or moved away from the starter to impart a relative rotation between the disc-shaped elements in order to deform the two strips of elastomeric material storing energy within them, and means for connecting the starter to and releasing it from the shaft of an internal combustion engine.

Figure 1:
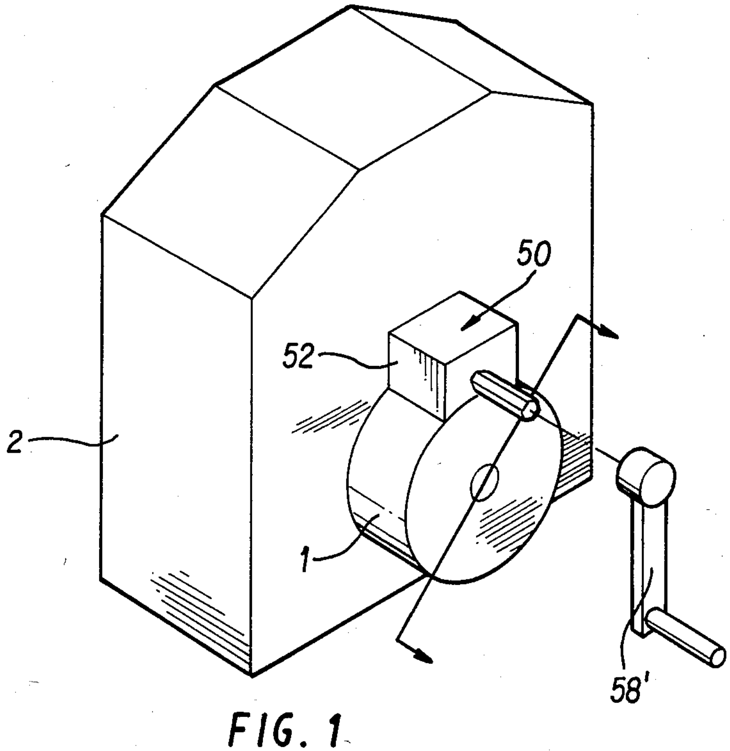
FIG. 1 shows in perspective view a mechanical starter according to the invention applied to an internal combustion engine.
Figure 2:
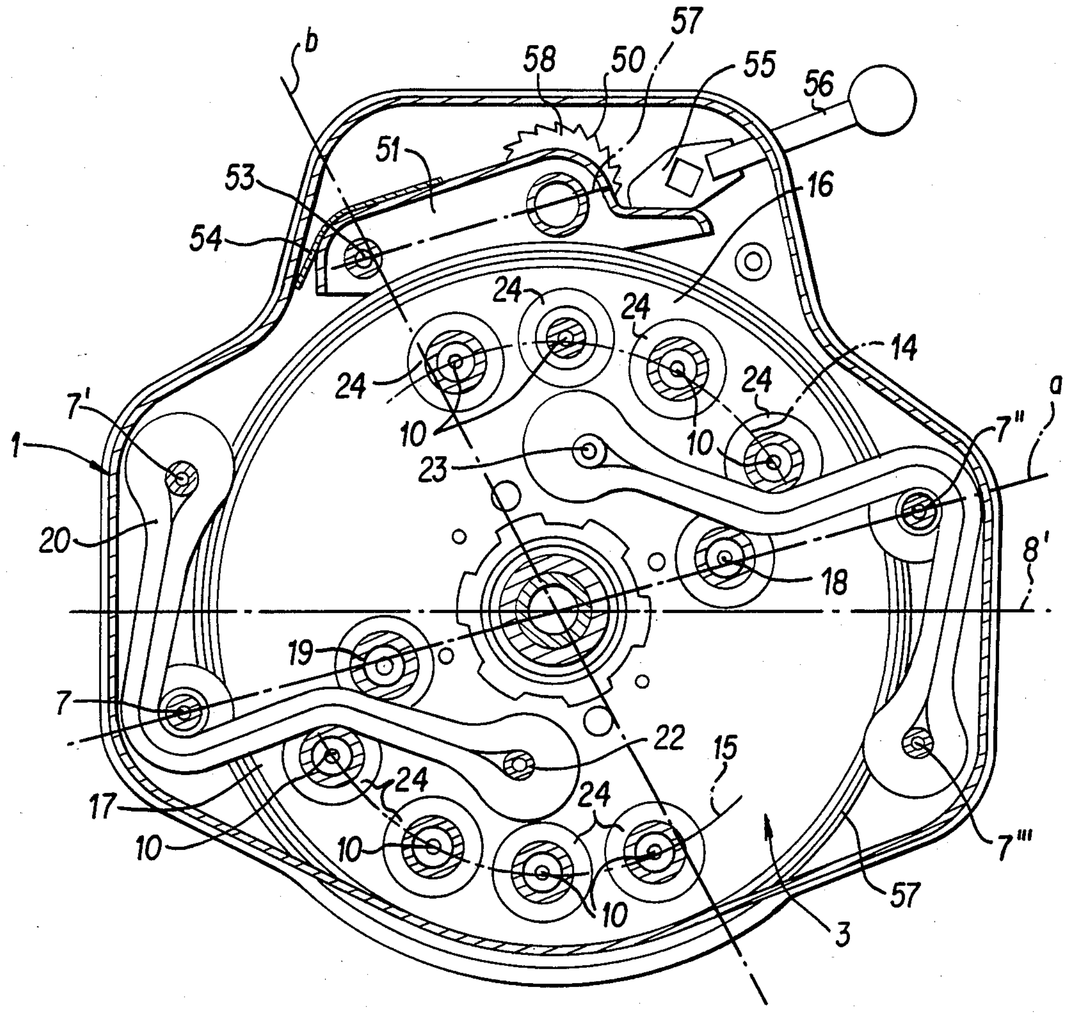
FIG. 2 shows a plan view of a starter according to the invention in a rest condition.
Figure 3:
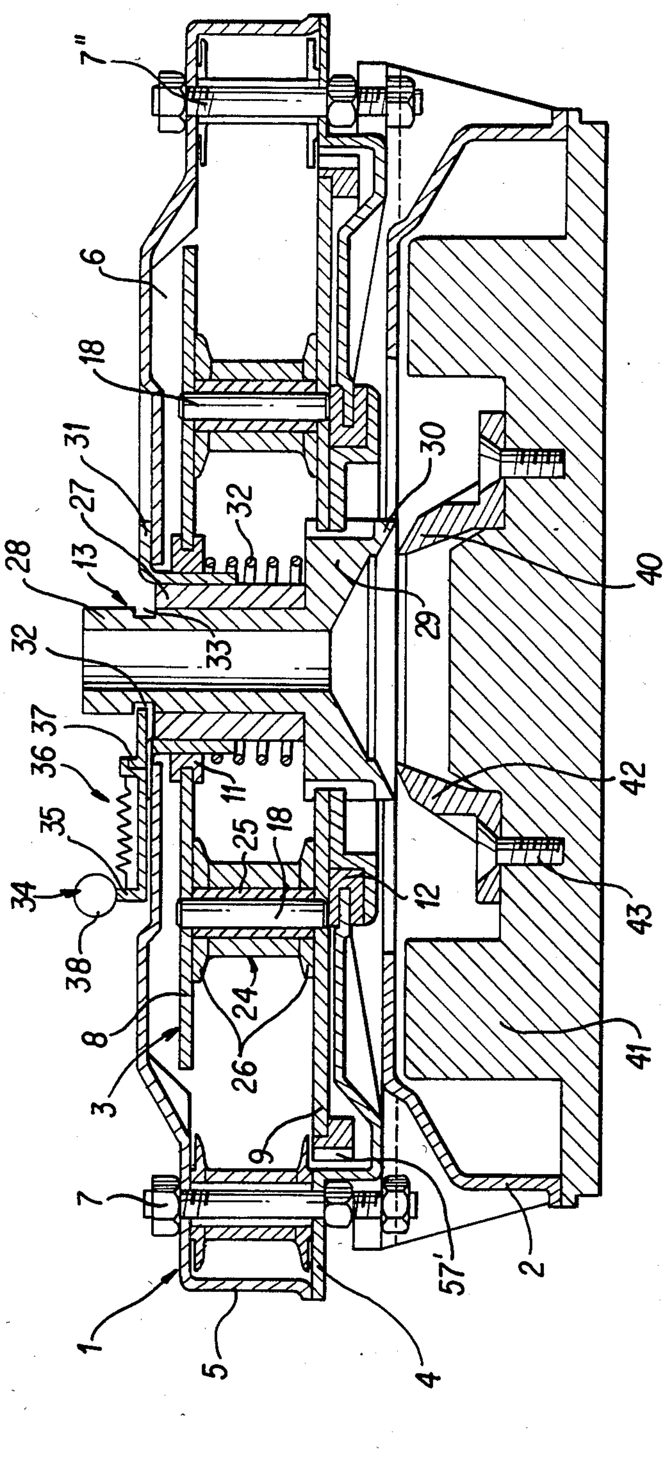
FIG. 3 shows in enlarged scale and in section along the line a of FIG. 2 the starter according to the invention with parts broken away to better illustrate the structure.

FIGS. 1, 2 and 3 represent a mechanical starter for internal combustion engines according to the invention. As shown therein, the mechanical starter comprises a disc-shaped element 1 secured to the envelope 2 of an internal combustion engine. The disc-shaped element 1 encases a disc-shaped element 3 which is coaxial with and rotatable with respect to disc-shaped element 1.

The disc-shaped element 1 is formed as a box-shaped body having a lower wall 4 and a cover 5, which define between them a space in which the disc-shaped element 3 is encased. The lower wall 4 and cover 5 are connected to each other by bolts 7, 7′, 7″ and 7‴, through which the disc-shaped element 1 is connected to the envelope 2 of the internal combustion engine.

The disc-shaped element 3 is formed by a pair of plates 8 and 9 spaced from each other and connected to each other by pins 10. The disc-shaped element 3, which can rotate with respect to the disc-shaped element 1, is connected to the latter through rolling bearings 11 and 12 encased in cavities provided in the disc-shaped element 1. A shaft 13 is coaxially provided with the disc-shaped elements 1 and 3.

FIG. 2 shows a plan view of the mechanical starter according to the invention in which the cover 5 and the plate 8 of the disc-shaped element 3 have been removed in order to better show the construction of the starter.

As shown in FIG. 2, the connection between the cover 5 and the lower wall 4, which together form the disc-shaped element 1, is effected through the four bolts 7, 7′, 7″, 7‴. Two bolts 7 and 7′ are on the left side, as view in FIG. 2, and two bolts 7″ and 7‴ are on the right side, as viewed in FIG. 2, the just described pairs of bolts being symmetrical with respect to the horizontal axis 8′ of the starter.

The disc-shaped element 3 encased within the disc-shaped element 1 has pins 10 interconnecting the plates 8 and 9, which define the disc-shaped element 3, arranged on circular arcs 14 and 15 which occupy opposite sectors 16 and 17 delimited by the ideal lines a and b shown with dashed lines in FIG. 2. As further shown in FIG. 3, the plates 8 and 9 are connected to each other also by a pair of pins 18 and 19 lying on the dashed line a and nearer the axis of rotation of the starter with respect to the pins 10.

The ends of the strips of elastomeric material 20 and 21 are connected to the disc-shaped elements 1 and 3. More particularly, one end of the strip 20 is fitted around the pin 7′ which is, as viewed in FIG. 2, on the left side and in the upper part of the figure, while the other end of the strip 20 is fitted around pin 22 integral with the plates 8 and 9 of the disc-shaped element 3. Likewise, the strip of elastomeric material 21 has one end which fits around the pin 7‴, which is on the right side and in the lower part of FIG. 2, while the other end of the strip 21 fits around the pin 23 integral with the plates 8 and 9 of the disc-shaped element 3. In this way the strips of elastomeric material 20 and 21 have their axes lying on a same plane.

Smaller rollers 24 are mounted on the pins 7, 10, 18 and 19 in a freely rotatable way with respect to the pins themselves. Each small roller 24 has a cylindrical body 25 at which ends are small discs 26 whose faces face one another and have an inclined plane configuration.

The shaft 13 is formed by a pair of hollow cylinders 27 and 28 coaxial with each other, with the hollow cylinder 27 having its inner surface in contact with the outer surface of the hollow cylinder 28. The hollow cylinders 27 and 28 are integral with each other with respect to relative rotation about their common axis and are free to slide with respect to one other along the common axis through means known per se. The hollow cylinder 27 has at its end, which is turned toward the envelope of the internal combustion engine, a flange 29 for supporting a frontal clutch crown 30 which has teeth lying on a plane having characteristics described below. Between the flange 29 of the cylinder 28 and the portion 31 of the cover 5 of the disc-shaped element 1, where the bearing 11 is encased to permit rotation of the disc-shaped element 3 with respect to the disc-shaped element 1, there is arranged a spring 32.

A circumferential groove is provided on the outer surface of the hollow cylinder 28 in which there is a through cavity 33. The circumferential groove 32 and the through cavity 33 therein cooperate with a pawl 34, movable in opposition to a spring 39. Pawl 34 and spring 39 are mounted on the outer surface of the cover 5 of the disc-shaped element 1.

The pawl 34 is formed by an L-shaped lever 35 sliding within a cavity 36 present in the cover 1. The end 37 of the L-shaped lever 35 can be encased in the circumferential groove 32 and in the through cavity 33 provided on the cylindrical body 27 of the shaft 13, while the other end of the L-shaped lever 35 bears a hand grip 38. Spring 39 connects the L-shaped lever to the wall of the cavity 36 in the cover 5.

As previously discussed, on the flange 29 of the cylinder 28 constituting a part of the shaft 13, there is a frontal clutch crown 30. The frontal clutch crown 30 can engage with and disengage from a frontal clutch crown 40 secured to the shaft of an internal combustion engine or, in particular, to a wheel 41 integral with the shaft of the internal combustion engine. The frontal clutch crown 40 is provided at the end of a disc-shaped body 42 secured by means of screws 43 or the like to wheel 41.

As an alternative to the frontal clutch crowns 30 and 40, similar devices can be provided which carry out the same function.

Figure 5:
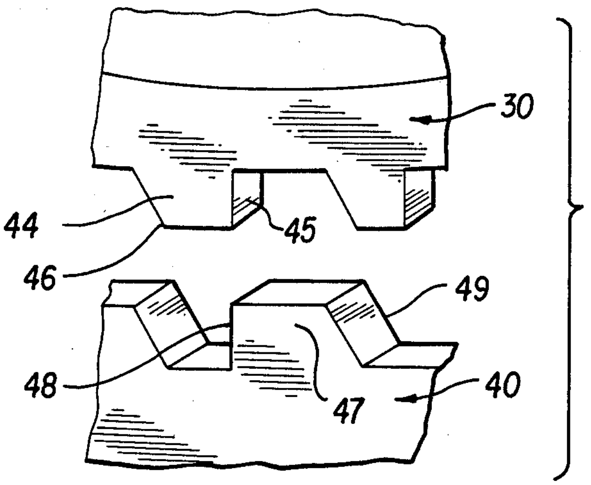

FIG. 5 shows in enlarged scale portions of the frontal clutch crowns to clearly show their characteristics. As shown therein, the frontal clutch crown 30 has teeth 44 which have flanks 45 lying on planes passing through the axis of rotation of the shaft of the internal combustion engine and inclined flanks 46. Likewise also, the frontal clutch crown 40 has teeth 47 having flanks 48 lying on planes passing through the axis of the shaft of the internal combustion engine and flanks 49 lying on inclined planes. The flanks 45 of the teeth 44 of the frontal clutch crown 30 are turned toward the direction of rotation of the shaft of the internal combustion engine, while the flanks 46 of the teeth 44 of the frontal clutch crown 30 are arranged in opposite direction to the rotation of the shaft of the engine.

Figure 4:
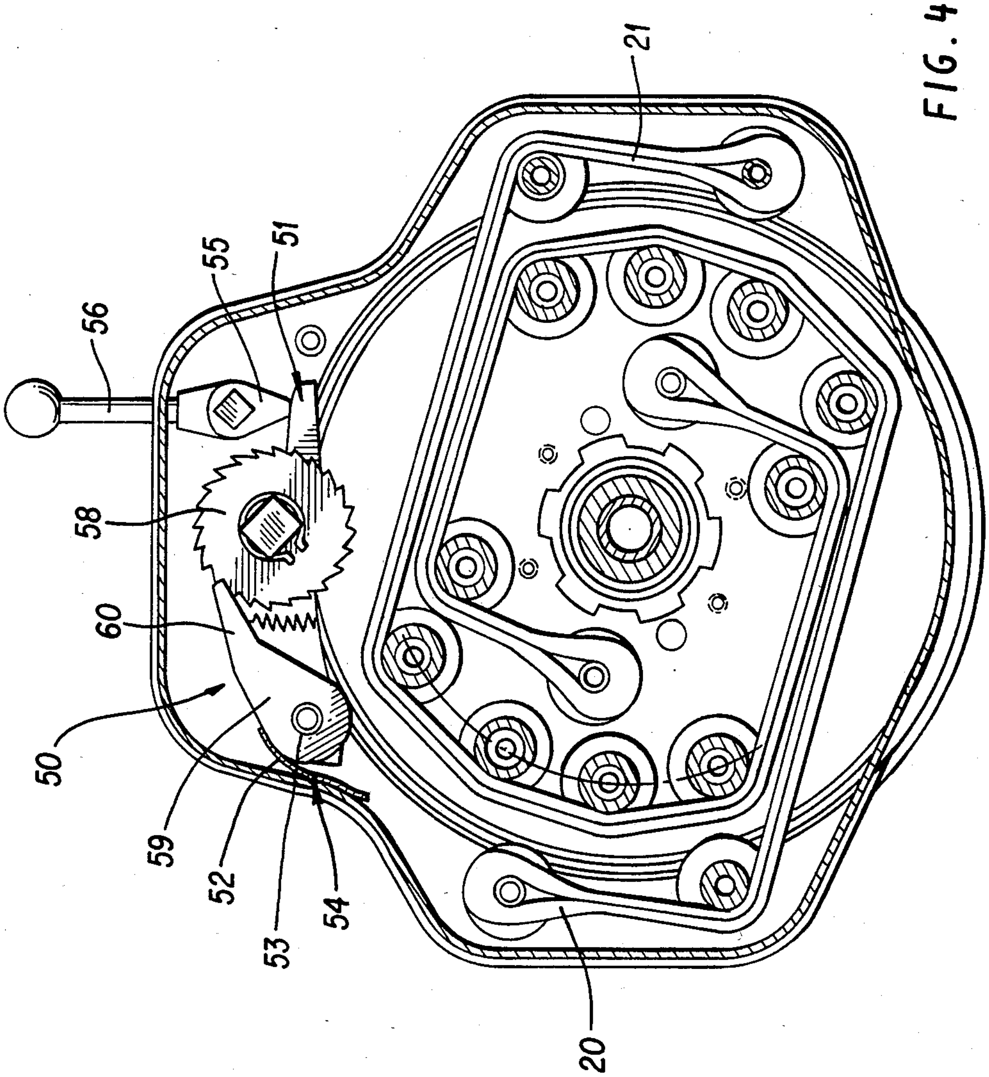
FIG. 4 shows a plan view of a starter according to the invention in a loading condition; and, FIG. 5 shows in perspective view a particular of the starter according to the invention.

A starter for engines according to the present invention is provided with a mechanism capable of being drawn near to and moved away from the starter to effect the mutual rotation of the disc-shaped elements 1 and 3 in order to deform the strips 20 and 21 of elastomeric material to store energy for starting an engine. FIGS. 1, 2 and 4 show a mechanism 50 for deforming strips 20 and 21 to store energy for starting. FIG. 2 shows the mechanism with parts broken away.

As shown in FIGS. 1–3, the mechanism 50 comprises a lever 51 pivoted at one of its ends to a fixed point and, more precisely, to an envelope 52 integral with the disc-shaped element 1 through a pin 53. A flat spring 54 is arranged between the envelope 52 and the end of the lever 51 where the latter is pivoted to envelope 52. The other end of lever 51 is associated with a cam 55 provided at the end of a hand grip 56 also pivoted to the envelope 52. At an intermediate position along the lever 51 there is provided a gear wheel 57 to which a saw tooth wheel 58 is coaxially mounted. A pawl 59 (FIG.

4) is pivoted to the pin 53 of the lever 51 and the end of pawl 59 engages with the saw tooth wheel 58, forcing the saw tooth wheel 58 and the gear wheel 57 to rotate in a single direction. A spring 60 (FIG. 4) connects the free end of the pawl 59 to the lever 51.

The operation of a mechanical starter for internal combustion engine according to the present invention will now be described with reference to FIGS. 2, 3 and 4.

FIGS. 2 and 3 show the mechanical starter according to the present invention in an unloaded condition, i.e., at rest.

In order to set in action the starter, first the lever 56, having at its one end a cam 55 (FIG. 2), is rotated in a counterclockwise direction so as to move the lever 51 in a clockwise direction, engaging the gear wheel 57 with the crown gear 57' borne by the plate 9 of the disc-shaped element 23. At this point, an operator rotates the crank 58' (FIG. 1) so that the gear wheel 57 is put into rotation, the gear wheel 57 in turn rotating the disc-shaped element 3.

The rotation of the disc-shaped element 3 in a counter-clockwise direction (FIG. 2) causes the strips of elastomeric material 20 and 21 to be put into tension. The rotation of the disc-shaped element 3 continues until the strips of elastomeric material are deformed to the extent shown in FIG. 4, at which time the strip 20 of elastomeric material leans against the small rollers 10 belonging to the sector which is opposite to strip 20 when the starter is in the rest condition. Likewise, the strip 21 of elastomeric material leans against the small rollers 10 belonging to the sector which is opposite to strip 21 when the starter is at rest.

As shown in FIG. 4, the strips 20 and 21 of elastomeric material assume a configuration containing rectilinear portions in the zones where the small rollers 10 are absent. The rectilinear portions, belonging to the strips, being parallel to one another.

As the rotation of the disc-shaped element 3 with respect to the disc-shaped element 1 proceeds, deformation of the strips occurs and, if an operator who operates the crank 58' (FIG. 1) interrupts loading of the starter, there is no automatic return of the disc-shaped element 3 to its rest condition since this is prevented by the presence of the saw tooth wheel 58 integral with the gear wheel 57, which is engaged with the end of the pawl 59.

During rotation of the disc-shaped element 3 with respect to the disc-shaped element 1, the end of the L-shaped lever 37 of the pawl 34 moves within the circumferential groove 32. The rotation of the disc-shaped element 3 with respect to the disc-shaped element 1 must stop at some point during the loading of the mechanical starter, and this occurs when the two disc-shaped elements reach the configuration shown in FIG. 4. When this configuration is attained, the L-shaped lever 37 of the pawl 34 is forced into the through opening 33 by action of spring 39. This blocks any further relative rotation of the disc-shaped element 3 with respect to the disc-shaped element 1. At the end of this operation, the loading of the mechanical starter has been completed, i.e., the energy has been stored in the mechanical starter through the deformation of the strips 20, 21 of elastomeric material. Now the energy stored in the mechanical starter can be supplied to the shaft of an internal combustion engine to start the engine.

To start the engine, first the lever 56 is rotated in a clockwise direction so as to move the cam 55 associated with lever 56 and permit the flat or helical spring 54 to rotate the lever 51 in a counterclockwise direction, releasing the gear wheel 57 from the crown gear 57' of the disc-shaped element 3 of the starter.

Then pawl 34 is actuated and moved away from shaft 13 against resistance of the spring 36. Thus, the end 37 of the L-shaped lever 37 of pawl 34 is removed from the through opening 33 and from the circumferential cavity 32. As a result, the spring 32 pushes the shaft 28 toward the shaft of the internal combustion engine, causing the frontal clutch crown 30 to engage with the frontal clutch crown 40. When the end 37 of the L-shaped lever of the pawl 34 moves away from the circumferential cavity 32 and from the through opening 33, the disc-shaped element 3 can freely rotate with respect to the disc-shaped element 1. Rotation of the disc-shaped element 3 with respect to the disc-shaped element 1 takes place under the action exerted by the strips of elastomeric material previously deformed during the loading of the starter. During rotation of disc-shaped element 3 relative to element 1, under action of the deformed strips 20 and 21 of elastomeric material, the distribution in opposite sectors of the bearing small rollers 24, against which the two strips lean, causes the strips to always be kept parallel to each other during their elastic return, vibrations in the strips being prevented by the action exerted by the small rollers borne by the pins 18 and 19 which constitute a non-vibrating means.

Since during this operation the starter is integral with the shaft of the internal combustion engine and, more particularly, with a wheel 41 integral with the shaft of the internal combustion engine, the shaft of the engine is put into rotation, receiving the energy from the starter.

Under the action of this energy the internal combustion engine is started. When the internal combustion engine is placed in service under action of the starter, the frontal clutch crown 40, rotates under the action of the shaft of the engine and the rotation of the frontal clutch crown 40 tends to rotate the crown gear 30 acting with it and belonging to the starter. Since, as shown in FIG. 5, the contact between the teeth 47 of the frontal clutch crown 40 and the teeth 44 of the frontal clutch crown 30 occurs respectively through the inclined planes 49 and 46, a minimum resistance offered by the frontal clutch crown 30 to rotate in the direction of the movement of rotation of the internal combustion engine shaft creates forces tending to move the frontal clutch crown 30 away from the frontal clutch crown 40. This causes the shaft 13 of the starter to move away from the shaft of the internal combustion engine and during this separation the circumferential groove 32 provided on the outer surface of the shaft 13 faces the end 37 of the L-shaped lever of the pawl 34. At this moment, under the action of the spring 39 associated with pawl 34, the end of the L-shaped lever of the pawl 34 is inserted into the circumferential groove 32 and the shaft 13 of the starter is blocked in a position separated from the shaft of the internal combustion engine.

From the previous description, it is understood that by means of a starter according to the present invention the aimed purposed are reached. Providing strips of elastomeric material having axes which lie on a same plane permits a great reduction in the overall dimensions of the starter which therefore can be miniaturized and the weight of the starter can be reduced, since the arrangement of the strips on a single plane reduces the dimensions of the heavy mechanical elements of the starter.

Also, operator safety is improved with a starter according to the present invention since, during the loading of the starter, the shaft of the engine, which must be set in action by the starter, is not engaging and therefore cannot originate kicks with injurious consequences to the operator.

Moreover, the effort required of an operator in setting in action the starter of the present invention is considerably reduced since the energy supplied by the operator to the starter for deformation of the strips can be delivered without regard to a required delivering time, that is, energy can be delivered more slowly by the operator.

Also, the force which must be applied by the operator to load the starter is lowered due to the gear reduction coupling between the gear wheel integral with the driving crank and the crown gear integral with the disc-shaped element 3 of the starter. This reduction can be further increased by interposing one or more gear wheels between the gear wheel and crown gear.

Also, the mechanical starter according to the present invention is very reliable since the energy dissipation within the starter is a minimum as moment contacts between the strips of elastomeric material are avoided while the strips get deformed in a minimum possible space. Also, the presence of brakes constituted by the coupling between the winding small rollers of the strips prevents vibrations which could cause the strips to contact with each other during the recovery of the deformation of the strips themselves. Finally, the reliability of a starter according to the present invention is a maximum since the operations that it must undergo to carry out its function are independent of one another so that one operation does not disturb or overstress elements of the starter which are not essential to it.

Although a particular embodiment of the present invention has been illustrated and described, it is understood that the invention is not limited thereto as many modifications can be made without departing from the spirit and scope of the invention.

We claim:

1. A mechanical starter for an internal combustion engine, comprising:

a pair of coaxial disc-shaped elements, one of which is rotatable with respect to the other, at least two strips of elastomeric material whose axes lie on a same plane, said strips of elastomeric material having one end fixed to one disc-shaped element and the other end fixed to the other disc-shaped element, one of said disc-shaped elements being positioned innermost and within the other disc-shaped element and containing a plurality of small rollers for supporting and guiding said strips of elastomeric material, the axes of said plurality of small rollers being arranged on at least two arcs of a circle situated in opposite sectors of the innermost disc-shaped element;

non-vibrating means respectively provided on said innermost disc-shaped element for each strip, each said non-vibrating means being respectively associated with the small rollers arranged on one of said arcs and comprising a small roller arranged nearer an axis of rotation of said one rotatable disc-shaped element with respect to the associated small rollers arranged on said one arc, each said strip passing between one of the rollers on a said arc and a said small roller forming a said non-vibrating means;

means for rotating one of said disc-shaped elements with respect to the other so as to deform said strips to store energy therein;

means for connecting one of said disc-shaped elements to the shaft of an internal combustion engine; and means for releasing the energy stored in said strips.

2. A mechanical starter as in claim 1, wherein each small roller of each non-vibrating means is arranged on a line which delimits an opposite sector.

3. A mechanical starter according to claim 1, wherein said means for rotating one disc-shaped element with respect to the other comprises a crown gear integral with the innermost disc-shaped element, a lever oscillating in opposition to a first flat spring around one of its ends, a cam acting on the other of said lever, a gear wheel engagable with the crown gear, said gear wheel having an axis of rotation at a position intermediate to the lever, and means for causing the gear wheel to rotate in a single direction, said gear wheel being rotatable by a removable crank.

4. A mechanical starter according to claim 3, wherein said means for causing the gear wheel to rotate in a single direction comprises a pawl oscillating in opposition to a second spring and acting on a saw tooth wheel coaxial and integral with the gear wheel.

5. A mechanical starter according to claim 1, wherein said means for connecting one of the disc-shaped element to the shaft of an internal combustion engine comprises a pair of frontal clutch crowns each having engaging teeth arranged on a flat face, a first frontal clutch crown being integral with the shaft of the internal combustion engine and a second frontal clutch crown being integral in rotation with one of the disc-shaped elements and sliding along the axis of this latter in opposition to a third spring, said third spring biasing said second clutch crown to slide into engagement with said first clutch crown, and means for locking and releasing the sliding of the second clutch crown to control engagement of the two clutch crowns.

6. A mechanical starter according to claim 5, wherein the means for locking and releasing the clutch crowns comprises a shaft integral with said second clutch crown, a circular cavity provided with a through opening in said shaft, and a movable pawl moving in opposition to a fourth spring having one end capable of engaging in said circular cavity and in the through opening present therein, said pawl being carried by one of the disc-shaped elements.

7. A mechanical starter according to claim 5, wherein the frontal clutch crowns have teeth whose flanks, in the direction of the movement of the shaft of the engine lie on planes passing through the axis of the engine shaft, while the flanks of the same teeth in a direction opposite to the rotation direction of the engine shaft lie on inclined planes.

8. A mechanical starter for an internal combustion engine, comprising:

a pair of coaxial disc-shaped elements, one of which is rotatable with respect to the other, at least two strips of elastomeric material whose axes lie on a same plane, said strips of elastomeric material having one end fixed to one disc-shaped element and the other end fixed to the other disc-shaped element, one of said disc-shaped elements being positioned innermost and within the other disc-shaped element and containing a plurality of small rollers for supporting and guiding said strips of elastomeric material, the axes of said plurality of small rollers being arranged on at least two arcs of a circle situated in opposite sectors of the innermost disc-shaped element;

non-vibrating means respectively provided on said innermost disc-shaped element for each strip, each said non-vibrating means being respectively associated with the small rollers arranged on one of said arcs and comprising a small roller arranged nearer an axis of rotation of said one rotatable disc-shaped element with respect to the associated small rollers arranged on said one arc, each said strip passing between one of the rollers on a said arc and a said small roller forming a said non-vibrating means;

means for rotating one of said disc-shaped elements with respect to the other so as to deform said strips to store energy therein;

means for connecting one of said disc-shaped elements to the shaft of an internal combustion engine; and means for releasing the energy stored in said strips, whereby upon rotation of the innermost disc-shaped element, each one of the strips of elastomeric material is deformed and leans against the plurality of small rollers belonging to the sector which is opposite to the same strip when the starter is in the rest condition.

9. A mechanical starter as in claim 8, whereby after the rotation of the innermost disc-shaped element the strips of elastomeric material assume a configuration containing rectilinear portions in zones where the plurality of small rollers are absent, said rectilinear portions being parallel to one another.

* * * * *